(12) United States Patent
Gao et al.

(10) Patent No.: US 11,899,303 B2
(45) Date of Patent: Feb. 13, 2024

(54) COLOR FILM STRUCTURE, COLOR FILM SUBSTRATE, DISPLAY MODULE AND MANUFACTURING METHODS THEREFOR, AND DISPLAY APPARATUS

(71) Applicant: BOE TECHNOLOGY GROUP CO., LTD., Beijing (CN)

(72) Inventors: Hao Gao, Beijing (CN); Yansong Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 158 days.

(21) Appl. No.: 17/628,160

(22) PCT Filed: Jan. 19, 2021

(86) PCT No.: PCT/CN2021/072705
§ 371 (c)(1),
(2) Date: Jan. 18, 2022

(87) PCT Pub. No.: WO2021/147858
PCT Pub. Date: Jul. 29, 2021

(65) Prior Publication Data
US 2022/0269125 A1    Aug. 25, 2022

(30) Foreign Application Priority Data

Jan. 20, 2020 (CN) .......................... 202010065881.0

(51) Int. Cl.
*G02F 1/1335* (2006.01)
(52) U.S. Cl.
CPC .. *G02F 1/133516* (2013.01); *G02F 1/133504* (2013.01); *G02F 1/133512* (2013.01); *G02F 1/133553* (2013.01)

(58) Field of Classification Search
CPC ......... G02F 1/133514; G02F 1/136222; G02F 1/133512; G02F 1/133509; H01L 29/78633; H01L 51/5284
See application file for complete search history.

(56) References Cited

U.S. PATENT DOCUMENTS

2008/0062361 A1    3/2008 Jang et al.
2008/0062362 A1*   3/2008 Teramoto .......... G02F 1/133555
                                                       445/24
(Continued)

FOREIGN PATENT DOCUMENTS

CN    101556397 A    10/2009
CN    103033977 A    4/2013
(Continued)

OTHER PUBLICATIONS

English translation for CN 103033977B; Qiao (Year: 2013).*
(Continued)

*Primary Examiner* — Jonathan Y Jung
(74) *Attorney, Agent, or Firm* — IP & T GROUP LLP

(57) ABSTRACT

A color film structure includes a black matrix, a color film layer and a reflective layer. The black matrix has a plurality of openings. The color film layer includes a plurality of filter portions, and at least a portion of each filter portion is located in an opening of the black matrix. The reflective layer is located on a side of the black matrix configured to be proximate to a light-emitting substrate, and an orthographic projection of the reflective layer on a plane where the black matrix is located is covered by the black matrix. The reflective layer is configured to reflect at least a part of light emitted from the light-emitting substrate to the black matrix back to the light-emitting substrate, so that at least a part of the light reflected back to the light-emitting substrate is emitted through the color film layer.

19 Claims, 10 Drawing Sheets

(56) References Cited

U.S. PATENT DOCUMENTS

| | | | | |
|---|---|---|---|---|
| 2016/0064694 | A1* | 3/2016 | Choi | H10K 50/865 |
| | | | | 257/40 |
| 2018/0210287 | A1* | 7/2018 | Wang | G02F 1/133553 |
| 2019/0129238 | A1* | 5/2019 | Wang | G02F 1/136209 |
| 2019/0229153 | A1* | 7/2019 | Park | C09K 11/0883 |

FOREIGN PATENT DOCUMENTS

| | | | | |
|---|---|---|---|---|
| CN | 103676316 | A | | 3/2014 |
| CN | 104199213 | A | | 12/2014 |
| CN | 103033977 | B | * | 8/2015 |
| CN | 106249463 | A | | 12/2016 |
| CN | 110471209 | A | | 11/2019 |
| CN | 111261681 | A | | 6/2020 |
| CN | 107632453 | B | * | 3/2021 |

OTHER PUBLICATIONS

Office Action for Chinese Patent Application No. 202010065881.0 issued by the Chinese Intellectual Property Office dated Nov. 23, 2021.
Office Action for Chinese Patent Application No. 202010065881.0 issued by the Chinese Intellectual Property Office dated Apr. 29, 2022.
Optically Pumped Vertical External Cavity Surface Emitting Semiconductor Laser Technology, Apr. 2022.

* cited by examiner

COLOR FILM STRUCTURE, COLOR FILM SUBSTRATE, DISPLAY MODULE AND MANUFACTURING METHODS THEREFOR, AND DISPLAY APPARATUS

CROSS-REFERENCE TO RELATED APPLICATIONS

This application is a national phase entry under 35 USC 371 of International Patent Application No. PCT/CN2021/072705 filed on Jan. 19, 2021, which claims priority to Chinese Patent Application No. 202010065881.0, filed on Jan. 20, 2020, which are incorporated herein by reference in their entirety.

TECHNICAL FIELD

The present disclosure relates to the field of display technologies, and in particular, to a color film structure, a color film substrate and a manufacturing method therefor, a display module and a manufacturing method therefor, and a display apparatus.

BACKGROUND

With the rapid development of the Internet of Things, display modules are widely used in smart products such as mobile phones, televisions and notebook computers. A display module can realize color display through the combination of a light-emitting substrate and a color film structure. When natural light enters the color film structure, a black matrix in the color film structure will absorb part of the natural light, thereby reducing the light reflectivity of a light-emitting surface of the display module and improving the contrast of the display module.

SUMMARY

In an aspect, a color film structure is provided. The color film structure includes a black matrix, a color film layer and a reflective layer. The black matrix has a plurality of openings. The color film layer includes a plurality of filter portions, and at least a portion of each filter portion is located in an opening of the black matrix. The reflective layer is located on a side of the black matrix configured to be proximate to a light-emitting substrate, and an orthogonal projection of the reflective layer on a plane where the black matrix is located is covered by the black matrix. The reflective layer is configured to reflect at least a part of light emitted from the light-emitting substrate to the black matrix back to the light-emitting substrate, so that at least a part of the light reflected back to the light-emitting substrate is emitted through the color film layer.

In some embodiments, the orthogonal projection of the reflective layer on the plane where the black matrix is located completely coincides with the black matrix.

In some embodiments, the reflective layer has a plurality of light-transmitting holes, and each light-transmitting hole corresponds to an opening. A border of an orthogonal projection of each light-transmitting hole on the plane where the black matrix is located coincides with a border of the opening, or is located outside a border of the opening.

In some embodiments, a surface of the reflective layer configured to be proximate to the light-emitting substrate is a plane. Or a surface of the reflective layer configured to be proximate to the light-emitting substrate has microstructures for scattering light, and the microstructures include at least one of zigzag structures, wavy structures, columnar structures arranged in an array, conical structures arranged in an array, and spherical structures arranged in an array. Or a surface of the reflective layer configured to be proximate to the light-emitting substrate includes at least one curved surface recessed towards a side where the black matrix is located.

In some embodiments, of the surface configured to be proximate to the light-emitting substrate, a portion located between two adjacent openings of the black matrix includes two curved surfaces recessed towards the side where the black matrix is located. The two curved surfaces are symmetrically arranged relative to a bisector of a reference line, the reference line is a dummy line in an arrangement direction of the two adjacent openings and from one of the two adjacent openings to the other opening. In the arrangement direction of the two adjacent openings and a direction from either of the two adjacent openings to the bisector, a thickness of a portion of the reflective layer located between the two adjacent openings increases.

In some embodiments, the reflective layer has a plurality of light-transmitting holes, and the surface of the reflective layer configured to be proximate to the light-emitting substrate includes a plurality of curved surfaces recessed towards the side where the black matrix is located. Each curved surface surrounds a light-transmitting hole.

In some embodiments, the reflective layer has a single-layer film structure.

In some embodiments, a material of the reflective layer includes at least one of silver, magnesium, copper and aluminum.

In some embodiments, the reflective layer includes a plurality of film layers stacked in a thickness direction of the color film structure, and a difference in refractive index between any two adjacent film layers is greater than or equal to 0.3.

In some embodiments, a thickness of at least one film layer in the reflective layer is an integer multiple of ¼ of a target wavelength. The target wavelength is a reference value set according to a wavelength range of light emitted by the light-emitting substrate.

In some embodiments, the plurality of film layers included in the reflective layer include first film layers and second film layers that are alternately arranged. A material of the first film layer includes silicon oxide and/or polyimide, and a material of the second film layer includes silicon nitride.

In some embodiments, a surface of the reflective layer configured to be away from the light-emitting substrate is a plane. Or a surface of the reflective layer configured to be away from the light-emitting substrate has microstructures for scattering light, and the microstructures include at least one of zigzag structures, wavy structures, columnar structures arranged in an array, conical structures arranged in an array, and spherical structures arranged in an array. Or a surface of the reflective layer configured to be away from the light-emitting substrate includes at least one curved surface recessed towards a side where the black matrix is located.

In another aspect, a color film substrate is provided. The color film substrate includes a base and the color film structure in any of the above embodiments. The color film structure is disposed on the base, and the reflective layer of the color film structure is disposed on a side of the black matrix of the color film structure away from the base.

In yet another aspect, a manufacturing method of the color film substrate is provided. The manufacturing method includes: manufacturing the black matrix with the plurality of openings on the base; manufacturing the reflective layer on a side of the black matrix away from the base; manufacturing the color film layer. An orthogonal projection of the reflective layer on the base is covered by an orthogonal projection of the black matrix on the base. The color film layer includes the plurality of filter portions, and the at least a portion of each filter portion is located in the opening of the black matrix.

In some embodiments, manufacturing the reflective layer on the side of the black matrix away from the base, includes: manufacturing an initial reflective layer on the side of the black matrix away from the base; and performing surface treatment on a surface of the initial reflective layer away from the base to form microstructures for scattering light on the surface, or to form at least one curved surface recessed towards a side where the black matrix is located on the surface. An orthogonal projection of the initial reflective layer on the base is covered by the orthogonal projection of the black matrix on the base.

In yet another aspect, a display module is provided. The display module includes a light-emitting substrate and the color film substrate mentioned above. The light-emitting substrate is an organic electroluminescent display substrate, or the light-emitting substrate includes a backlight module, an array substrate and a liquid crystal layer. The light-emitting substrate has a plurality of sub-pixel light-emitting regions. The color film substrate is arranged in a stack with the light-emitting substrate, and an opening of the black matrix of the color film substrate corresponds to a sub-pixel light-emitting region. In a case where the light-emitting substrate is the organic electroluminescent display substrate, the black matrix, the color film layer and the reflective layer of the color film substrate are closer to the light-emitting substrate than the base of the color film substrate. In a case where the light-emitting substrate includes the backlight module, the array substrate and the liquid crystal layer, the backlight module is disposed on a side of the array substrate away from the color film substrate.

In yet another aspect, another display module is provided. The display module includes a light-emitting substrate and the color film structure in any one of the above embodiments. The light-emitting substrate is an organic electroluminescent display substrate. The light-emitting substrate has a plurality of sub-pixel light-emitting regions. The color film structure is directly disposed on an encapsulation layer of the light-emitting substrate, and the reflective layer of the color film structure is closer to the light-emitting substrate than the black matrix of the color film structure. An opening of the black matrix of the color film substrate corresponds to a sub-pixel light-emitting region.

In yet another aspect, a manufacturing method of the display module is provided. The manufacturing method includes: manufacturing the reflective layer on the encapsulation layer of the light-emitting substrate; manufacturing the black matrix on the side of the reflective layer away from the light-emitting substrate; and manufacturing the color film layer. An orthogonal projection of the reflective layer on the light-emitting substrate is covered by an orthogonal projection of the black matrix on the light-emitting substrate. The color film layer includes the plurality of filter portions, and the at least a portion of each filter portion is located in the opening of the black matrix.

In some embodiments, before manufacturing the reflective layer on the encapsulation layer of the light-emitting substrate, the manufacturing method further includes manufacturing base structures on the encapsulation layer of the light-emitting substrate. Morphology of a surface of the base structures away from the light-emitting substrate is adapted to morphology of a surface, proximate to the light-emitting substrate, of the reflective layer to be formed. Manufacturing the reflective layer on the encapsulation layer of the light-emitting substrate, includes: forming microstructures for scattering light on the surface of the reflective layer proximate to the light-emitting substrate, or forming the at least one curved surface recessed towards the side where the black matrix is located on the surface of the reflective layer proximate to the light-emitting substrate.

In yet another aspect, a display apparatus is provided. The display apparatus includes the display module in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
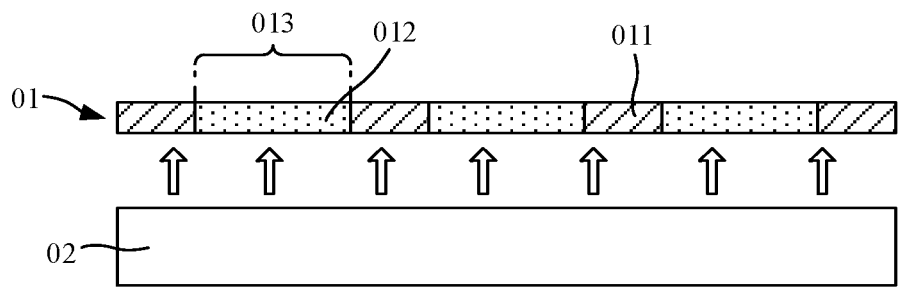
FIG. 1 is a schematic diagram of a color film structure in the related art.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as open and inclusive, i.e., "including, but not limited to." In the description of the specification, the terms such as "some embodiments", and "example" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined by "first" and "second" may explicitly or implicitly include one or more of the features. In the description of the embodiments of the present disclosure, "a plurality of/the plurality of" mean two or more unless otherwise specified.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C. The phrase "A and/or B" includes the following three combinations: only A, only B, and a combination of A and B.

Exemplary embodiments are described herein with reference to sectional views and/or plan views as idealized exemplary drawings. In the drawings, thicknesses of layers and regions are enlarged for clarity. Thus, variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a feature of being curved. Therefore, the regions shown in the accompanying drawings are schematic in nature, and their shapes are not intended to show actual shapes of regions in a device, and are not intended to limit the scope of the exemplary embodiments.

Herein, the expression "an orthogonal projection of A on a base covers an orthogonal projection of B on the base" is used, which means that a border of the orthogonal projection of A on the base coincides with a border of the orthogonal projection of B on the base, alternatively that the border of the orthogonal projection of A on the base is at least partially non-overlapping with the border of the orthogonal projection of B on the base, and the orthogonal projection of B on the base is within a range of the orthogonal projection of A on the base.

In the related art, referring to FIG. 1, a color film structure 01 is provided on a light exit side of a light-emitting substrate 02. The color film structure 01 includes a black matrix 011 and a color film layer 012. The black matrix 011 has a plurality of openings 013, and the color film layer 012 is located in the openings 013 of the black matrix 011. The above structure has following problems: a part of light emitted by the light-emitting substrate 02 is emitted to a region where the black matrix 011 is located and is then absorbed by the black matrix 011, which increases the light loss of the light emitted by the light-emitting substrate 02, reduces the amount of light output of a whole display module including the color film structure 01 and the light-emitting substrate 02, and reduces the transmission efficiency of the light emitted by the light-emitting substrate 02.

Figure 2:
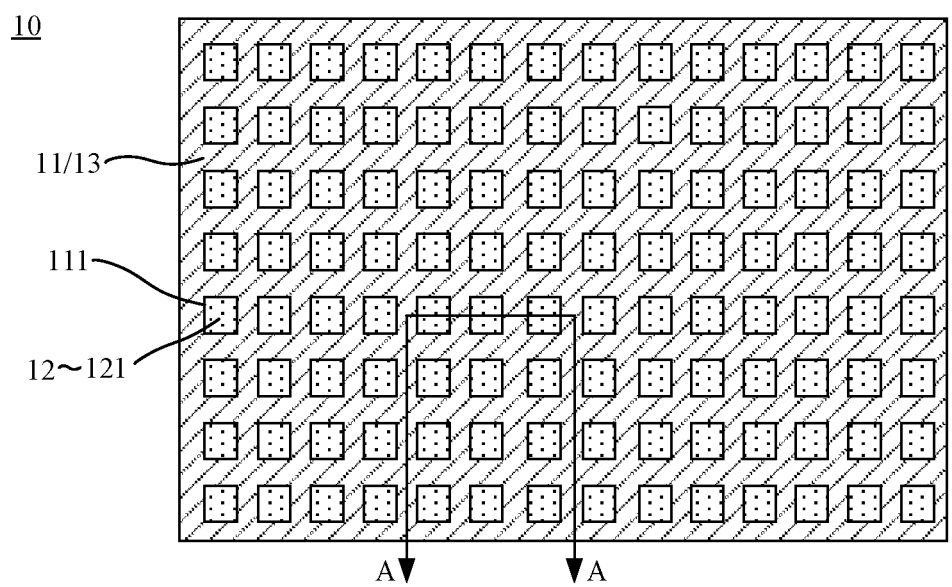
FIG. 2 is a top view of a color film structure, in accordance with some embodiments.
Figure 3:
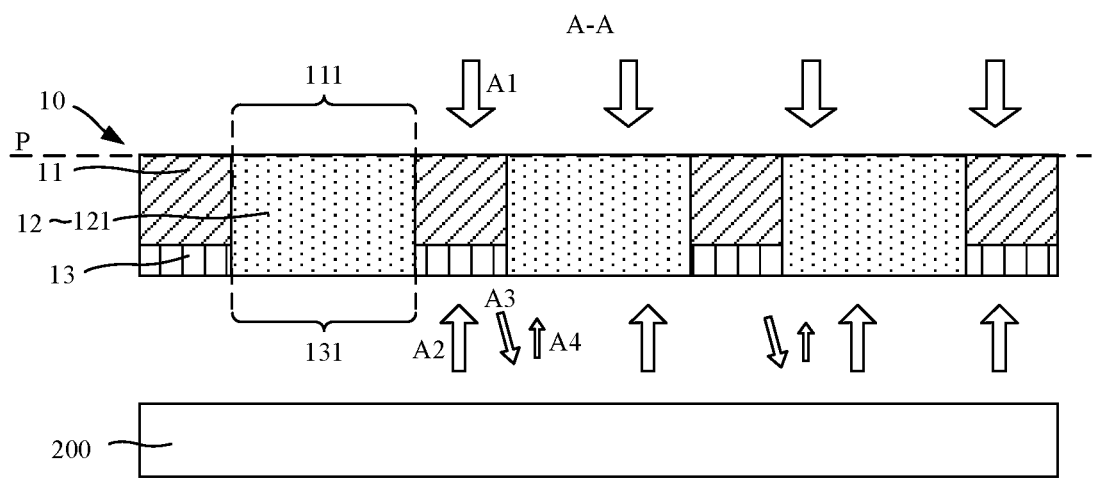
FIG. 3 is a sectional view taken along the line A-A in FIG. 2.

Based on the above problems, some embodiments of the present disclosure provide a color film structure 10. Referring to FIGS. 2 and 3, the color film structure 10 includes a black matrix 11, a color film layer 12 and a reflective layer 13. The black matrix 11 has a plurality of openings 111. The color film layer 12 includes a plurality of filter portions 121, and at least a portion of each filter portion 121 is located in an opening 111 of the black matrix 11. For example, each filter portion 121 is entirely located in an opening 111 of the black matrix 11; for another example, a main body portion of each filter portion 121 is located in an opening 111 of the black matrix 11, and an edge of the filter portion is lapped on the black matrix 11. For example, referring to FIG. 3, a filter portion 121 is located in an opening 111 of the black matrix 11. The black matrix 11 is configured to shield structures with high reflectivity in the light-emitting substrate 200 and absorb natural light (as shown by the arrow A1 in FIG. 3), so as to reduce the light reflectivity of a surface of the color film structure 10 configured to be away from the light-emitting substrate 200, increase the contrast of a display module including the color film structure 10 and the light-emitting substrate 200, and improve the display effect of the display module.

Referring to FIG. 3, the reflective layer 13 is located on a side of the black matrix 11 configured to be proximate to the light-emitting substrate 200, and an orthogonal projection of the reflective layer 13 on a plane P where the black matrix 11 is located is covered by the black matrix 11, so as to ensure that the reflective layer 13 does not affect an aperture ratio of sub-pixels of the display module.

The reflective layer 13 is configured to reflect at least a part of light emitted from the light-emitting substrate 200 to the black matrix 11 back to the light-emitting substrate 200, so that at least a part of the light reflected back to the light-emitting substrate 200 is emitted through the color film layer 12. Referring to FIG. 3, a part of light emitted from the light-emitting substrate 200 to a region where the black matrix 11 is located is reflected by the reflective layer 13 (as shown by the arrow A2 in FIG. 3), and is then emitted to a side of the light-emitting substrate 200 (as shown by the arrow A3 in FIG. 3); and afterwards, a part of the light emitted to the side of the light-emitting substrate 200 is reflected again by the light-emitting substrate 200 (as shown by the arrow A3 in FIG. 4). In this way, a part of the light originally emitted to the black matrix 11 is reflected back and forth at least once between the reflective layer 13 and the light-emitting substrate 200, and thus a propagation direction of the light is changed, which results in that a part of the light is finally emitted through the color film layer 12. Therefore, the amount of light emitted by the light-emitting substrate 200 absorbed by the black matrix 11 is reduced, the amount of light emitted through the color film layer 12 is increased, and the light transmission efficiency of the light-emitting substrate 200 is enhanced.

It will be noted that, the light-emitting substrate 200 has some structures with high light reflectivity, such as thin film transistors and signal lines. For example, in a case where the light-emitting substrate 200 is a display substrate of an organic electroluminescent display module (organic light-emitting diode (OLED) display module), an anode and/or a cathode included therein is also able to reflect light; for another example, in a case where the light-emitting substrate 200 is a display substrate of a liquid crystal display (LCD) display module, a backlight module included therein is also able to reflect light. These structures with high reflectivity are able to reflect a part of the light reflected by the reflective layer 13 back to the light-emitting substrate 200 to the color film layer 12, and the light is emitted through the color film layer 12, thereby reducing the loss of the light emitted from the light-emitting substrate 200 to the black matrix 11, increasing a light output rate of the color film layer 12, increasing a light output rate of the color film structure 10, and improving the display effect of the display module.

Figure 12:
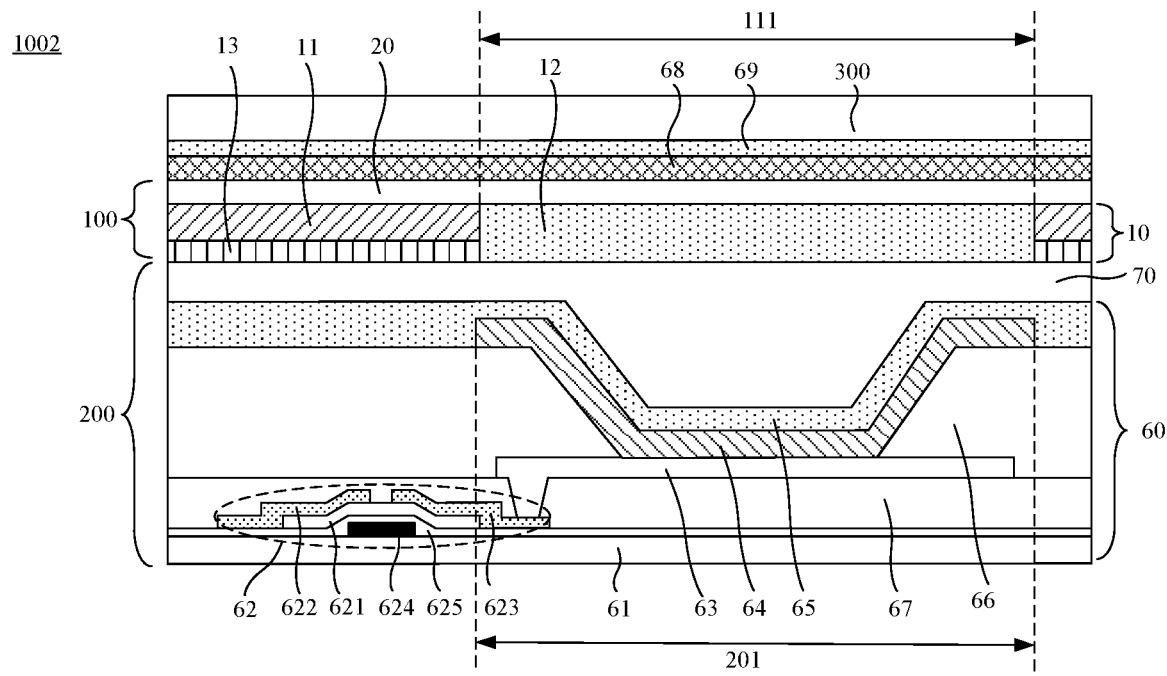
FIG. 12 is another schematic diagram of a display module, in accordance with some embodiments.

For example, in a case where the light-emitting substrate 200 is an OLED display substrate, referring to FIG. 12, and the light-emitting substrate 200 includes at least an anode 63 and/or a cathode 65 with high reflectivity. A part of the light reflected by the reflective layer 13 back to the light-emitting substrate 200 will irradiate the anode 63 and cathode 65 of the light-emitting substrate 200, and after being reflected by the anode 63 and/or the cathode 65 of the light-emitting substrate 200, a part of the light will be emitted to the color film layer 12 of the color film structure 10, and be emitted from the color film layer 12.

For example, in a case where the color film structure 10 and the light-emitting substrate 200 belong to a liquid crystal display module, the color film structure 10 belongs to a color film substrate of the liquid crystal display module, and the light-emitting substrate 200 includes a backlight module, an array substrate and a liquid crystal layer of the liquid crystal display module, the light-emitting substrate 200 includes at least the backlight module with high reflectivity; and a part of the light reflected by the reflective layer 13 back to the light-emitting substrate 200 will irradiate the backlight module of the light-emitting substrate 200, and after being reflected by the backlight module of the light-emitting substrate 200, a part of the light will be emitted to the color film layer 12 and be emitted from the color film layer 12.

It will be noted that, in some embodiments of the present disclosure, the reflective layer 13 is directly in contact with the black matrix 11; and in some other embodiments, other film structure(s) may be provided between the reflective layer 13 and the black matrix 11, which is not specifically limited herein.

A coverage area of the reflective layer 13 on the plane where the black matrix 11 is located will affect the overall reflectivity of the reflective layer 13. Referring to FIG. 3, the orthogonal projection of the reflective layer 13 on the plane P where the black matrix is located completely coincides with the black matrix 11, so that all the light emitted from the light-emitting substrate 200 to the black matrix 11 may be reflected by the reflective layer 13. By improving a reflection area of the reflective layer 13, the reflectivity of the reflective layer 13 is increased, and the amount of light lost by the black matrix 11 to the light emitted by the light-emitting substrate 200 is reduced.

Figure 5:
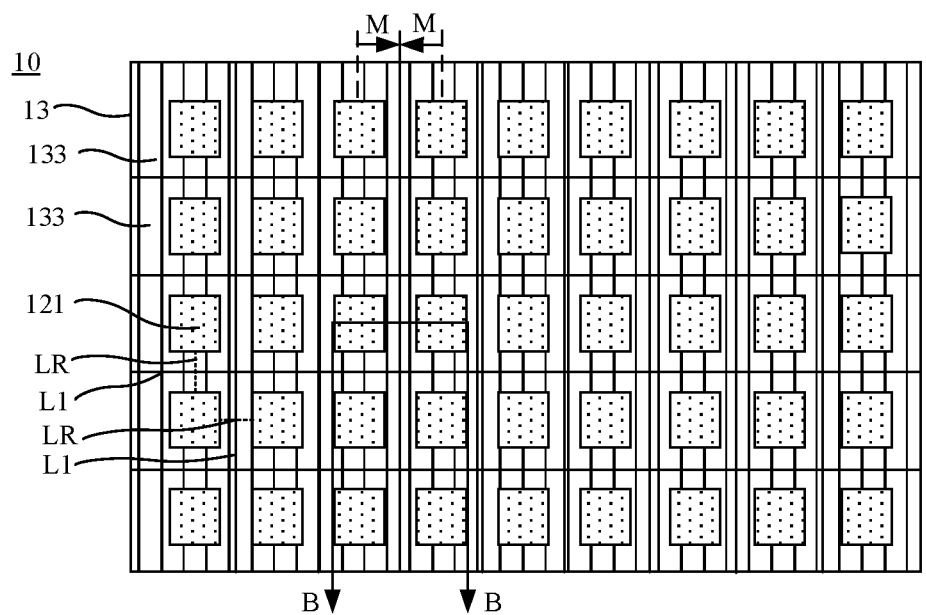
FIG. 5 is a schematic diagram of a color film structure, in accordance with some embodiments.

In some embodiments, referring to FIGS. 3 and 5, the reflective layer 13 has a plurality of light-transmitting holes 131, and each light-transmitting hole 131 corresponds to an opening 111 of the black matrix 11. A border of an orthogonal projection of each light-transmitting hole 131 on the plane P where the black matrix 11 is located coincides with a border of the opening 111 corresponding to the light-transmitting hole 131, or is located outside a border of the opening 111 corresponding to the light-transmitting hole 131, so that the reflective layer 13 is entirely covered by the black matrix 11, which prevents light from the outside (a side of the black matrix 11 configured to be away from the light-emitting substrate 200) from irradiating the reflective layer 13, and prevents the light reflectivity of a surface of the display module from increasing.

In a case where the border of the orthogonal projection of each light-transmitting hole 131 on the plane where the black matrix 11 is located coincides with the border of the opening 111 corresponding thereto, an orthogonal projection of the reflective layer 13 on the black matrix 11 completely coincides with the black matrix 11.

In a case where the border of the orthogonal projection of each light-transmitting hole 131 on the plane where the black matrix 11 is located is located outside the border of the opening 111 corresponding thereto, an orthogonal projection of the reflective layer 13 on the black matrix 11 is located within a range of the black matrix 11, and an area of the orthogonal projection of the reflective layer 13 on the black matrix 11 is less than an area of the black matrix 11.

Figure 4A:
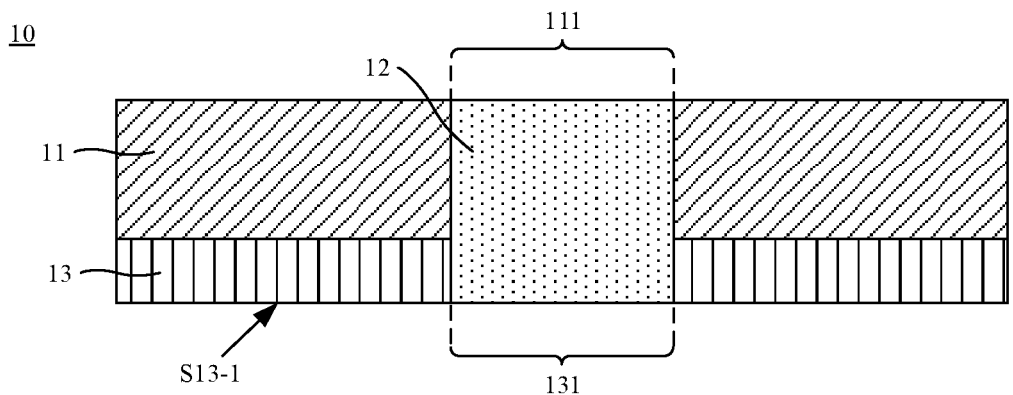
FIG. 4A is a schematic diagram of a color film structure in a case where a reflective layer has a single-layer film structure, in accordance with some embodiments.

In some embodiments, referring to FIG. 4A, a surface S13-1 of the reflective layer 13 configured to be proximate to the light-emitting substrate 200 is a plane. For example, the reflective layer 13 can be directly manufactured through an evaporation or coating process, and the process is simple; and there is no need to perform post-processing on the surface S13-1 of the reflective layer 13 configured to be proximate to the light-emitting substrate 200, which saves costs. In addition, the plane has a function of mirror reflection, and has a high reflection efficiency for light.

Figure 4B:
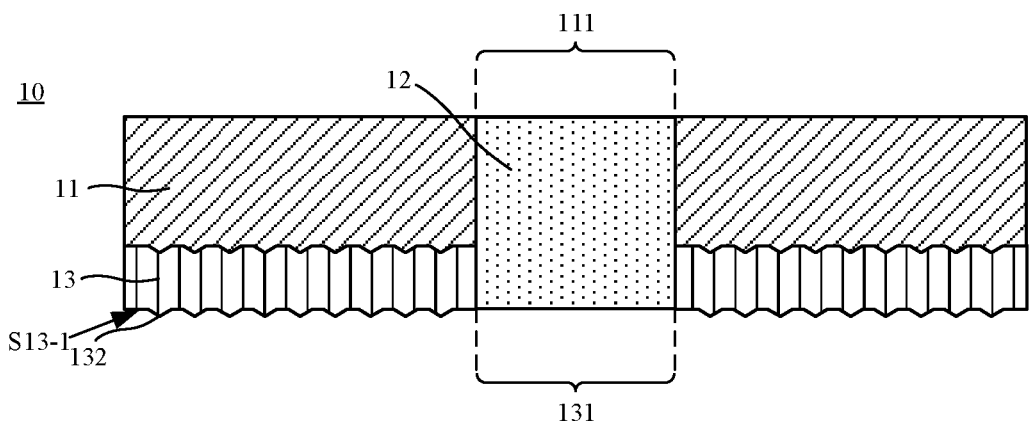
FIG. 4B is another schematic diagram of a color film structure in a case where a reflective layer has a single-layer film structure, in accordance with some embodiments.

In some embodiments, referring to FIG. 4B, a surface S13-1 of the reflective layer 13 configured to be proximate to the light-emitting substrate 200 has microstructures 132 for scattering light. For example, the microstructures include at least one of zigzag structures, wavy structures, columnar structures arranged in an array, conical structures arranged in an array, and spherical structures arranged in an array. FIG. 4B is only a schematic diagram showing an example where the microstructures are zigzag structures. The microstructures on the surface of the reflective layer 13 configured to be proximate to the light-emitting substrate 200 enable the reflective layer 13 to have a diffuse reflection effect, which further enables a part of light emitted from a sub-pixel light-emitting region of the light-emitting substrate 200 to the reflective layer 13 to be finally emitted through a filter portion 121 corresponding to the sub-pixel light-emitting region. Therefore, a part of the light reflected by the reflective layer 13 and the light-emitting substrate 200 is prevented from being emitted through a filter portion 121 corresponding to an adjacent sub-pixel light-emitting region, light mixing between adjacent sub-pixel light-emitting regions is avoided, the contrast of the display module is improved, and the display effect of the display module is enhanced.

For example, the microstructures 132 may be periodically arranged on the surface of the reflective layer 13 configured to be proximate to the light-emitting substrate 200. For example, referring to FIG. 4B, the microstructures 132 on the surface S13-1 of the reflective layer 13 may be a plurality of strip structures with an equal spacing. The strip structures and the reflective layer 13 are integrally formed; referring to FIG. 4B, a cross-section of a strip structure is a pointed structure (corresponding to a zigzag structure). Alternatively, the cross-section of a strip structure is a smooth curved surface structure (corresponding to a wavy structure).

Figure 6:
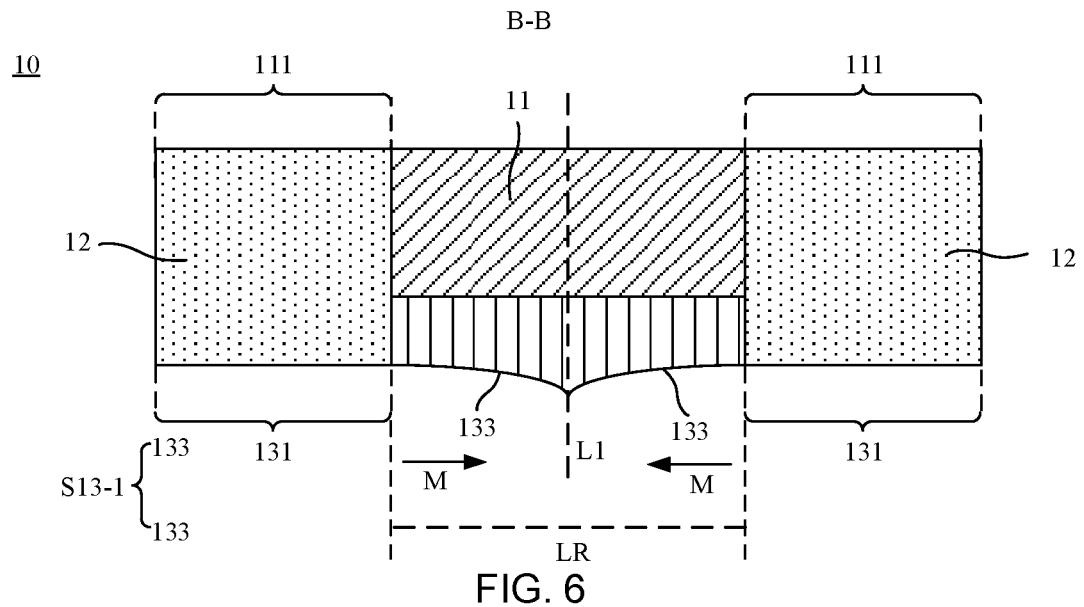
FIG. 6 is a sectional view taken along the line B-B in FIG. 5.

In some embodiments, referring to FIGS. 5 and 6, the surface S13-1 of the reflective layer 13 configured to be proximate to the light-emitting substrate 200 includes at least one curved surface 133 recessed towards a side where the black matrix is located, so that light emitted from each sub-pixel light-emitting region is reflected as much as possible to the sub-pixel light-emitting region of the light-emitting substrate 200 and a peripheral region thereof, and is finally emitted through a filter portion 121 corresponding to the sub-pixel light-emitting region. The number, shape and positional relationship of curved surfaces 133 may be selectively set according to specific reflectance requirements, which are not specifically limited herein.

On this basis, for example, referring to FIG. 6, of the surface S13-1 configured to be proximate to the light-emitting substrate 200 (a bottom surface of the reflective layer 13 in FIG. 6), a portion located between two adjacent openings 111 of the black matrix 11 includes two curved surfaces 133 recessed towards the side where the black matrix 11 is located (an upper side in FIG. 6). The two curved surfaces 133 are symmetrically arranged relative to a bisector L1 of a reference line LR (in a horizontal direction in FIG. 6). The reference line LR is a dummy line in an arrangement direction of the two adjacent openings 111 and from one of the two adjacent openings to the other opening.

In the arrangement direction of the two adjacent openings 111 of the black matrix 11 (the horizontal direction in FIG. 6) and in a direction from either of the two adjacent openings to the bisector L1 (from the filter portion 121 to the dashed line L1 in FIG. 6, i.e., in the direction shown by the arrow M), a thickness of the portion of the reflective layer 13 located between the two adjacent openings 111 gradually increases. That is, in the direction from either of the two adjacent openings 111 to the bisector L1, the surface of the reflective layer 13 configured to be proximate to the light-emitting substrate 200 is gradually bent towards a direction away from the black matrix 11.

In this way, the two curved surfaces 133 form two arc-shaped reflecting surfaces, and the two arc-shaped reflecting surfaces each have a shape facing its adjacent sub-pixel light-emitting region, so that the reflection efficiency of light originally emitted to the black matrix 11 may be further improved, and more of the light originally emitted to the black matrix 11 may be emitted through the color film layer 12. Moreover, it is possible to reduce the probability that the reflective layer 13 reflects light to an adjacent sub-pixel light-emitting region, and prevent light emitted from a sub-pixel light-emitting region from being emitted through a filter portion 121 corresponding to the adjacent sub-pixel light-emitting region after being reflected by the reflective layer 13 and the light-emitting substrate 200. Here, a central angle of each curved surface 133 may be set according to actual conditions.

In some embodiments, in a row direction in which light-transmitting holes 131 are arranged, a portion of the reflective layer 13 between any two adjacent light-transmitting holes 131 has two curved surfaces 133 mentioned above; and in a column direction in which the light-transmitting holes 131 are arranged, a portion of the reflective layer 13 between any two adjacent light-transmitting holes 131 has two curved surfaces 133 mentioned above.

For example, in a case where the reflective layer 13 has the plurality of light-transmitting holes 131, referring to FIGS. 5 and 6, the surface S13-1 of the reflective layer 13 configured to be proximate to the light-emitting substrate 200 includes a plurality of curved surfaces 133 recessed towards the side where the black matrix 11 is located, and each curved surface 133 surrounds a light-transmitting hole 131, so that the reflective layer 13 forms a structure similar to a reflector. A light-transmitting hole 131 corresponds to a sub-pixel light-emitting region of the light-emitting substrate 200, light emitted by the sub-pixel is emitted into a region with the light-transmitting hole 131 as a center, and each curved surface 133 surrounds a light-transmitting hole 131, so that among light emitted from a sub-pixel light-emitting region, most of the light emitted to a periphery of the light-transmitting hole 131 is reflected to the sub-pixel light-emitting region and the peripheral region of the light-emitting substrate 200 through the curved surface 133 surrounding the light-transmitting hole 131, and is emitted through the filter portion 121 corresponding to the sub-pixel light-emitting region.

In some embodiments, the reflectivity of the reflective layer 13 is greater than or equal to 90%, so that most of the light emitted to the reflective layer 13 can be reflected by the reflective layer 13. As the reflectivity of the reflective layer 13 increases, a reflection effect of the reflective layer 13 gradually increases, and a light output efficiency of the color film structure 10 gradually increases. For example, the reflectivity of the reflective layer 13 may be 90%, 92%, or 93.5%.

It will be understood that, in the above embodiments, that the reflectivity of the reflective layer 13 is greater than or equal to 90% is an alternative embodiment, not the only possible embodiment. For example, the reflectivity of the reflective layer 13 may be less than 90%.

On the basis of the above embodiments, the reflective layer 13 may have a single-layer film structure or a multi-layer film structure.

In some embodiments, referring to FIGS. 4A and 4B, the reflective layer 13 may have a single-layer film structure. The reflective layer 13 can be manufactured by means of evaporation deposition, sputtering or coating, and a process for manufacturing the single-layer film structure is simple.

In a case where the reflective layer 13 has the single-layer film structure, a material of the reflective layer 13 includes at least one of silver, magnesium, copper and aluminum. The above metal materials have high reflectivity, which can meet the requirements for the overall reflectivity of the reflective layer 13.

Figure 7A:
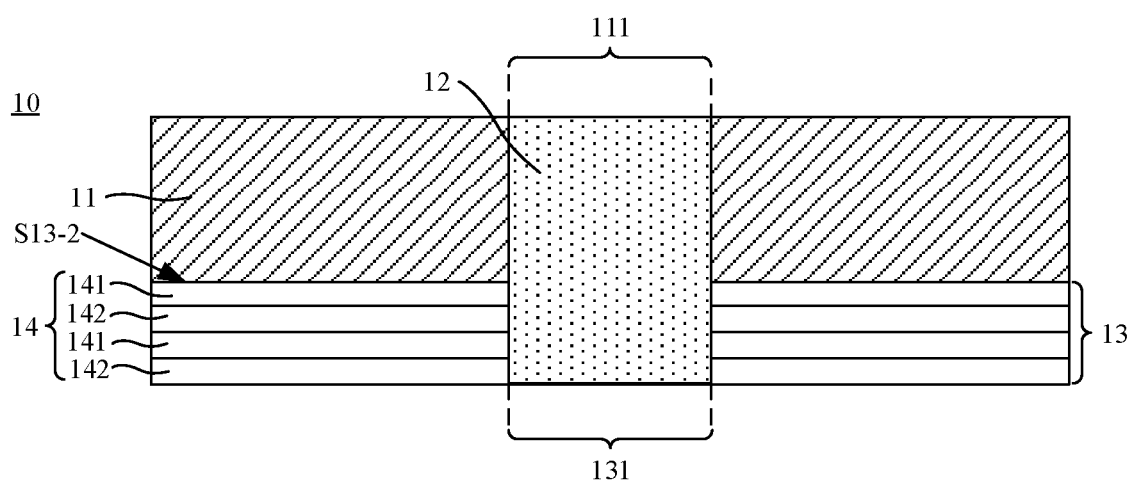
FIG. 7A is a schematic diagram of a color film structure in a case where a reflective layer includes a plurality of film layers, in accordance with some embodiments.
Figure 7B:
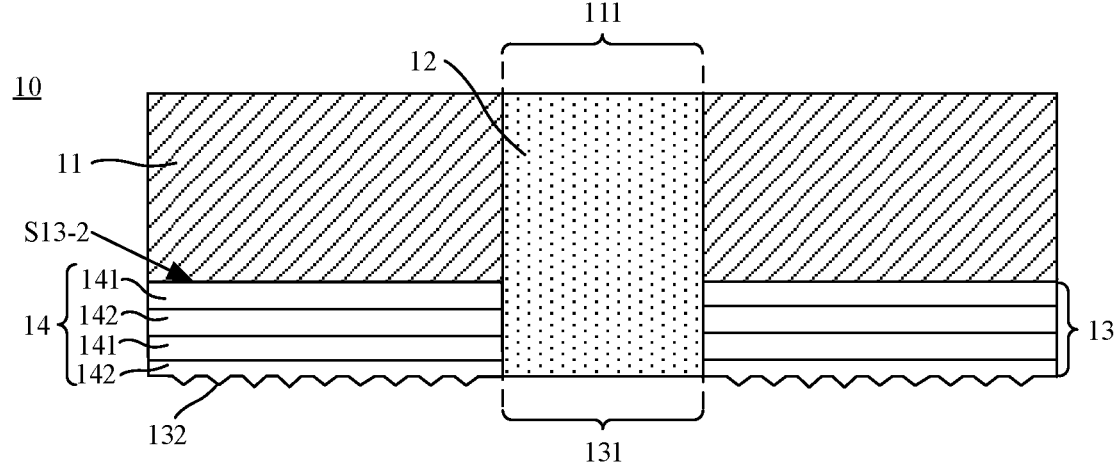
FIG. 7B is another schematic diagram of a color film structure in a case where a reflective layer includes a plurality of film layers, in accordance with some embodiments.
Figure 7C:
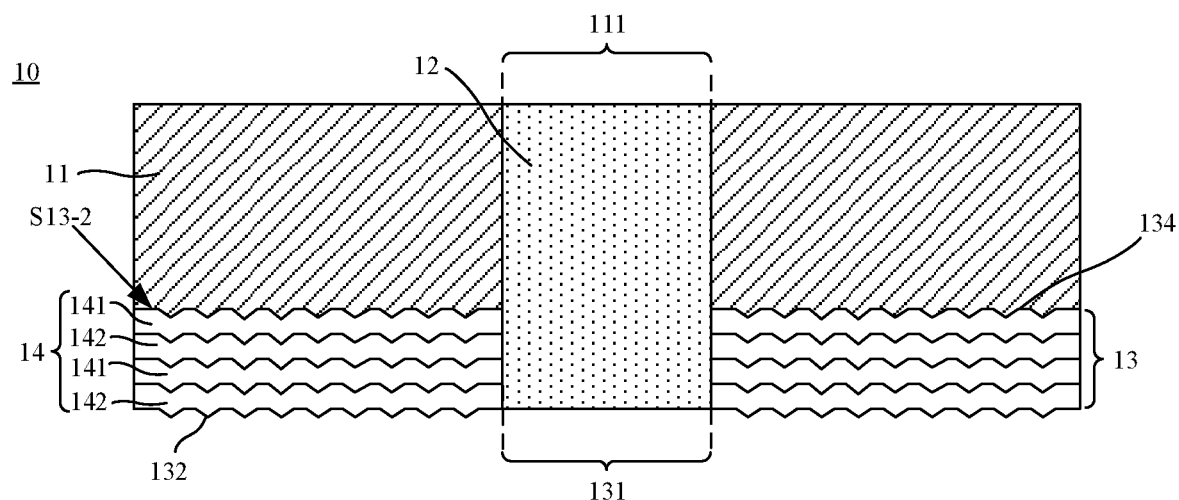
FIG. 7C is yet another schematic diagram of a color film structure in a case where a reflective layer includes a plurality of film layers, in accordance with some embodiments.

In some embodiments, referring to FIGS. 7A to 7C, the reflective layer 13 includes a plurality of film layers 14 stacked in a thickness direction of the color film structure 10, and a difference in refractive index between any two adjacent film layers 14 is greater than or equal to 0.3, so as to enhance the reflectivity of light on contact surfaces between two adjacent film layers 14 and increase the overall reflectivity of the reflective layer 13. The reflective layer 13 includes the plurality of film layers 14, and the plurality of film layers 14 may be made of a low-cost non-metallic material on a premise that the reflectivity of the reflective layer 13 meets the requirements, thereby reducing the manufacturing cost of the color film structure 10.

For example, in a case where the number of film layers 14 included in the reflective layer 13 is greater than or equal to four (for example, the reflective layer 13 includes four film layers 14), the difference in refractive index between two adjacent film layers 14 is greater than or equal to 0.3. For example, in the thickness direction of the color film structure 10 an in a direction from the black matrix 11 to the reflective layer 13, refractive indexes of the film layers 14 may gradually increase (for example, the refractive indexes of the film layers 14 are 1.8, 2.1, 2.5 and 2.8 in sequence), alternatively, the refractive indexes of the film layers 14 may gradually decrease (for example, the refractive indexes of the film layers 14 are 2.5, 2.2, 1.7 and 1.4 in sequence), alternatively, the refractive indexes of the film layers 14 may fluctuate (for example, the refractive indexes of the film layers 14 are 1.8, 2.2, 1.9 and 1.5 in sequence).

The plurality of film layers 14 included in the reflective layer 13 are stacked in the thickness direction of the color film structure 10, and adjacent film layers 14 are closely attached to each other. Each film layer 14 can be manufactured through evaporation deposition, plasma enhanced chemical vapor deposition (PECVD) or coating, which is not specifically limited herein.

In order to further improve the reflectivity of the film layers 14 included in the reflective layer 13, a thickness of at least one film layer 14 in the reflective layer 13 is an integer multiple of ¼ of a target wavelength. The target wavelength is a reference value set according to a wavelength range of light emitted by the light-emitting substrate 200. According to the Bragg mirror principle, in a case where a thickness of a film layer 14 is an integer multiple of ¼ of the target wavelength, a corresponding reflectivity of the film layer 14 is the largest, thereby enhancing the reflection effect and preventing light from being absorbed by the black matrix 11 as much as possible.

It will be noted that, the reference value set for the wavelength range of the light emitted by the light-emitting substrate 200 may be a wavelength value of light accounting for a highest proportion among light actually emitted by the light-emitting substrate 200. For example, a wavelength of the light actually emitted by the light-emitting substrate 200 is between 500 nm and 600 nm. Light with a wavelength of 550 nm accounts for the highest proportion, and the reference value set for the wavelength range of the light emitted by the light-emitting substrate 200 is 550 nm. In this case, the integer multiple of ¼ of the target wavelength is M×(550÷4) nm=M×137.5 nm, where M is a positive integer.

The thickness of at least one film layer 14 in the reflective layer 13 is an integer multiple of ¼ of the target wavelength. For example, among the plurality of film layers 14 included in the reflective layer 13, a thickness of a film layer 14 configured to be proximate to the light-emitting substrate 200 is an integer multiple of ¼ of the target wavelength; alternatively, among the plurality of film layers 14 included in the reflective layer 13, a thickness of each film layer 14 is an integer multiple of ¼ of the target wavelength.

In some embodiments, the plurality of film layers 14 included in the reflective layer 13 include first film layers 141 and second film layers 142 that are alternately arranged. A material of the first film layers includes silicon oxide and/or polyimide, and a material of the second film layers includes silicon nitride. Compared with a case where each of the plurality of film layers 14 included in the reflective layer 13 is made of a different material, in this embodiment, the first film layers 141 and the second film layers 142 may be alternately formed when the reflective layer 13 is manufactured, and the manufacturing process is simple.

For example, referring to FIGS. 7A to 7C, the reflective layer 13 is formed by stacking four film layers 14, including two first film layers 141 and two second film layers 142, and the first film layers 141 and the second film layers 142 are alternately formed. For example, a film layer 14 closest to the black matrix 11 is a first film layer 141, and the first film layer 141 is attached to the black matrix 11. In a direction from the black matrix 11 to the light-emitting substrate 200, the plurality of film layers included in the reflective layer 13 are a first film layer 141, a second film layer 142, a first film layer 141 and a second film layer 142 in sequence. The first film layers 141 are silicon oxide film layers or polyimide film layers with a relatively low refractive index, and the second film layers 122 are silicon nitride film layers with a relatively high refractive index. The silicon oxide film layers, the polyimide film layers and the silicon nitride film layers are all non-metal film layers, the manufacturing cost of which is lower than that of metal film layers.

In some embodiments, referring to FIG. 7A, a surface of each film layer 14 included in the reflective layer 13 that is configured to be proximate to the light-emitting substrate 200 may be a plane. Each film layer 14 may be directly manufactured through an evaporation or coating process, and the process is simple; and there is no need to perform post-processing on the surface of the film layer 14 configured to be proximate to the light-emitting substrate 200, which saves costs. In addition, the plane has the function of mirror reflection, and has high reflection efficiency for light.

In some embodiments, referring to FIG. 7B, among the plurality of film layers 14 included in the reflective layer 13, a surface of at least one film layer 14 configured to be proximate to the light-emitting substrate 200 has microstructures 132 for scattering light; alternatively, referring to FIG. 7C, a surface of each film layer 14 included in the reflective layer 13 that is configured to be proximate to the light-emitting substrate 200 has microstructures 132 for scattering light. In this way, the reflective layer 13 has a diffuse reflection effect, and thus a part emitted to the reflective layer 13 among light emitted from a sub-pixel light-emitting region of the light-emitting substrate 200 is finally able to be emitted through the filter portion 121 corresponding to the sub-pixel light-emitting region, which prevents light mixing between adjacent sub-pixel light-emitting regions, improves the contrast of the display module, and enhances the display effect of the display module. The microstructures 132 include at least one of zigzag structures, wavy structures, columnar structures arranged in an array, conical structures arranged in an array, and spherical structures arranged in an array.

In some embodiments, referring to FIG. 7A and FIG. 7B, a surface S13-2 of the reflective layer 13 configured to be away from the light-emitting substrate 200 (an upper surface of the reflective layer 13 in FIG. 7A and FIG. 7B) is a plane, and there is no need to perform post-processing on the surface of the reflective layer 13 configured to be away from the light-emitting substrate 200, which saves costs.

In some embodiments, referring to FIG. 7C, a surface S13-2 of the reflective layer 13 configured to be away from the light-emitting substrate 200 (an upper surface of the reflective layer 13 in FIG. 7C) has microstructures 134 for scattering light. The microstructures 134 include at least one of zigzag structures, wavy structures, columnar structures arranged in an array, conical structures arranged in an array, and spherical structures arranged in an array. FIG. 7C is only a schematic diagram showing an example where the microstructures are zigzag structures. Alternatively, the surface of the reflective layer 13 configured to be away from the light-emitting substrate 200 includes at least one curved surface recessed towards the side where the black matrix is located.

The surface of the reflective layer 13 configured to be away from the light-emitting substrate 200 has the microstructures 134 for scattering light, alternatively, the surface of the reflective layer 13 configured to be away from the light-emitting substrate 200 includes the at least one curved surface recessed towards the side where the black matrix 11 is located, so that the surface of the reflective layer 13 configured to be away from the light-emitting substrate 200 has a diffuse reflection effect. When strong light from the outside irradiates a side of the color film structure 10 configured to be away from the light-emitting substrate 200, the light passes through the black matrix 11 and is reflected by the reflective layer 13 to a region outside the black matrix 11, thereby reducing the reflectivity of the region where the black matrix 11 is located, improving the contrast of the display module under strong light irradiation, and improving the display effect of the display module under strong light.

Figure 8:
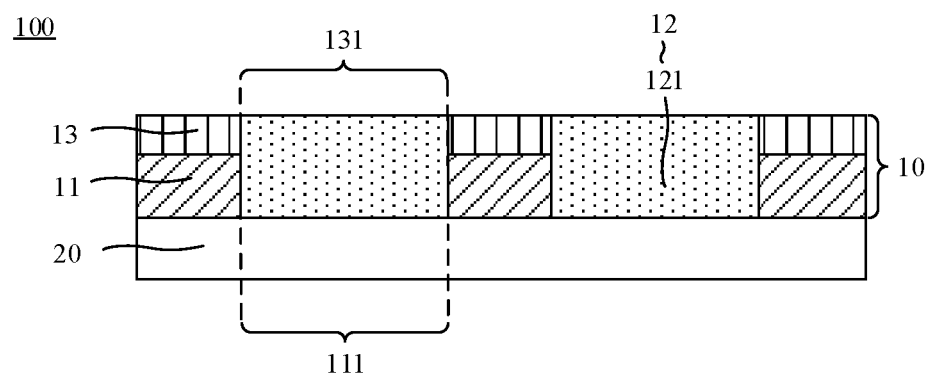
FIG. 8 is a schematic diagram of a color film substrate, in accordance with some embodiments.

The color film structure 10 provided by embodiments of the present disclosure may be separately provided on a base to form a color film substrate. Thus, in some embodiments, a color film substrate 100 is provided. Referring to FIG. 8, the color film substrate 100 includes a base 20 and a color film structure 10 disposed on the base 20. The color film structure 10 may be a color film structure 10 obtained by combining any one or more of the above embodiments or examples, and its specific features, structures, materials or characteristics will not be described in detail herein. The reflective layer 13 of the color film structure 10 is disposed on a side of the black matrix 11 of the color film structure 10 away from the base 20, so that when the color film substrate 100 and the light-emitting substrate 200 are combined to form the display module, the reflective layer 13 of the color film structure 10 is located on a side of the black matrix 11 thereof configured to be proximate to the light-emitting substrate 200.

Figure 9:
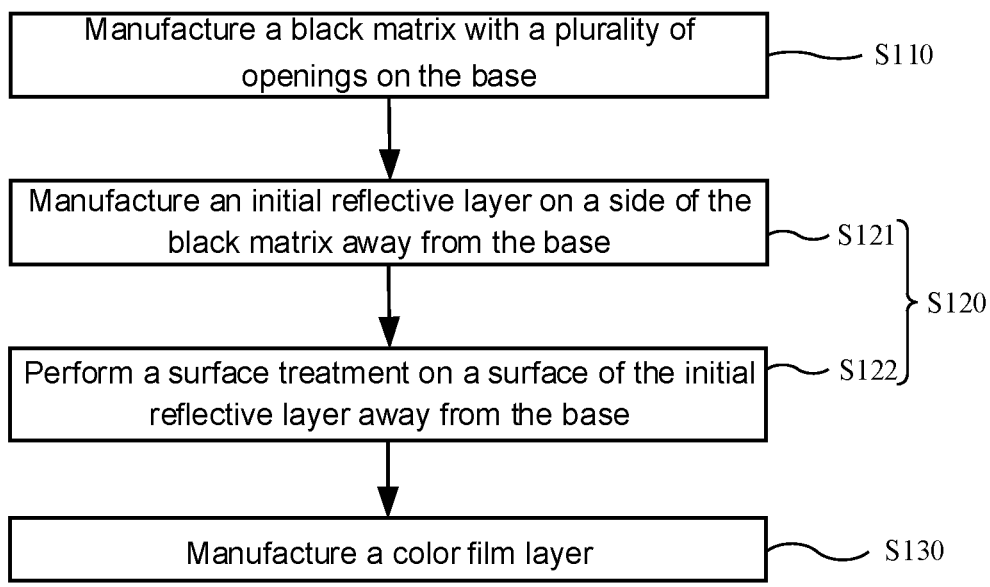
FIG. 9 is a flow diagram of a manufacturing method of a color film substrate, in accordance with some embodiments.
Figure 10:
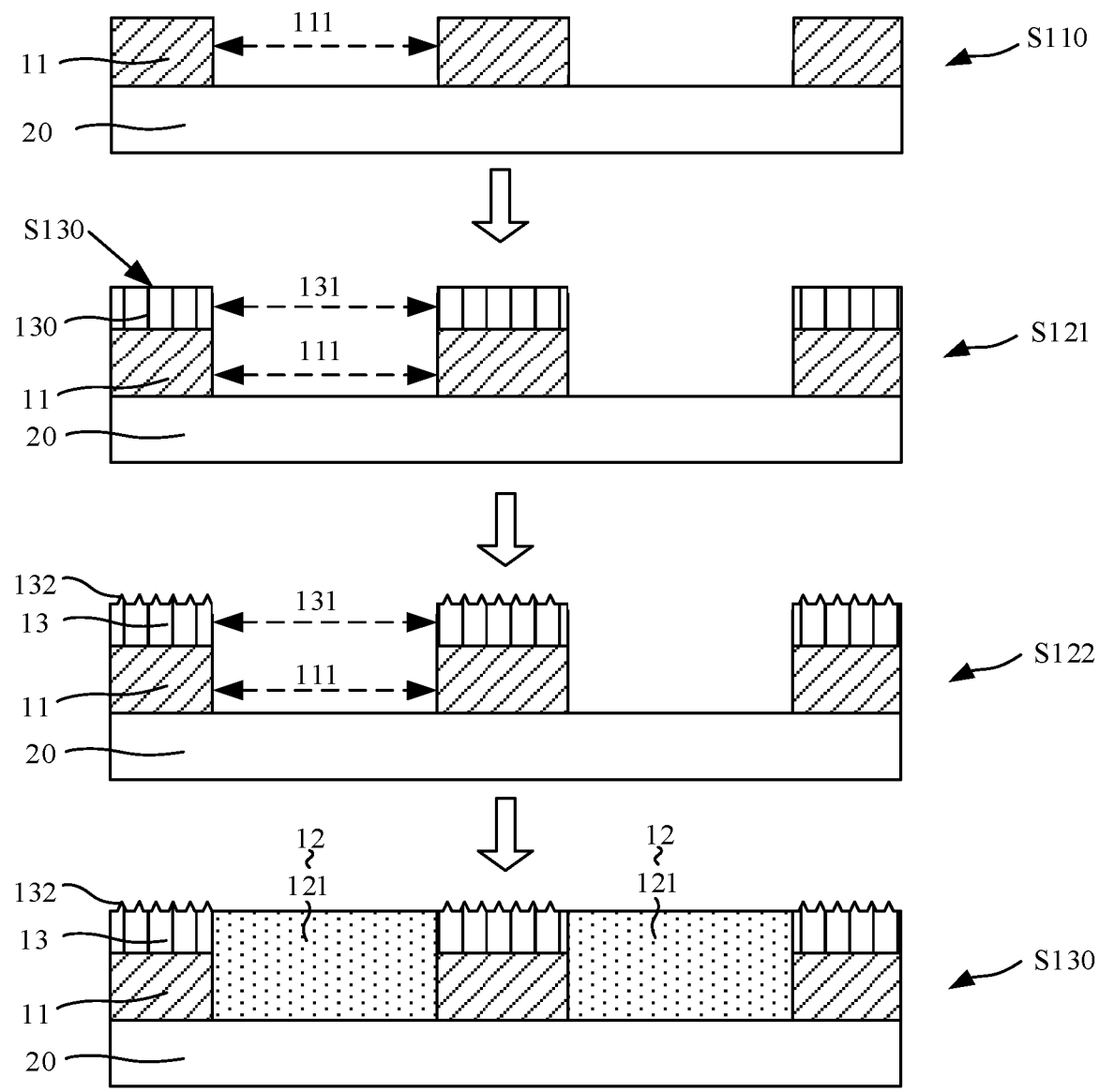
FIG. 10 is a schematic diagram showing steps of manufacturing a color film substrate, in accordance with some embodiments.

Referring to FIGS. 9 and 10, a manufacturing method of the above color film substrate includes S110 to S130.

In S110, a black matrix 11 with a plurality of openings 111 is manufactured on a base 20.

In S120, a reflective layer 13 is manufactured on a side of the black matrix 11 away from the base 20.

An orthogonal projection of the reflective layer 13 on the base 20 is covered by an orthogonal projection of the black matrix 11 on the base 20. For example, the reflective layer 13 may be manufactured through processes such as evaporation, vapor deposition, sputtering or coating.

In S130, a color film layer 12 is manufactured.

The color film layer 12 includes a plurality of filter portions 121, and at least a portion of each filter portion 121 is located in an opening 111 of the black matrix 11.

In some embodiments, in a case where a surface of the reflective layer 13 configured to be proximate to the light-emitting substrate 200 has microstructures 132 for scattering light, or a surface of the reflective layer 13 configured to be proximate to the light-emitting substrate 200 has at least one curved surface recessed towards a side where the black matrix 11 is located, referring to FIGS. 9 and 10, S120 (in which the reflective layer 13 is manufactured on a side of the black matrix 11 away from the base 20) includes S121 to S122.

In S121, an initial reflective layer 130 is manufactured on the side of the black matrix 11 away from the base 20. An orthogonal projection of the initial reflective layer 130 on the base 20 is covered by the orthogonal projection of the black matrix 11 on the base 20.

In S122, a surface treatment is performed on a surface S130 of the initial reflective layer 130 away from the base 20, so that the surface S130 forms microstructures 132 for scattering light, or forms at least one curved surface recessed towards the side where the black matrix 11 is located (a process of manufacturing other film layers in the color film substrate will not be specifically described herein).

The microstructure 134 or the curved surface recessed toward the side where the black matrix 11 is located may be formed through an etching, ion bombardment or sputtering process, and different manufacturing processes may be selected according to different structures. For specific features, structures, materials or characteristics of the microstructure 132 and the curved surface, reference may be made to the description of the color film structure 10 in the above embodiments, and the specific features, structures, materials or characteristics of the microstructure 132 and the curved surface will not be described in detail herein.

In some embodiments, the reflective layer 13 has a single-layer film structure. In this case, a thin film may be formed on a side of the black matrix 11 away from the base 20, and then the thin film is patterned to form the plurality of the light-transmitting holes 131, thereby forming the reflective layer 13.

For example, in a case where the reflective layer 13 has the single-layer film structure, and the surface of the reflective layer 13 away from the base 20 has zigzag structures with a periodic variation, referring to FIG. 10, the initial reflective layer 130 may first be formed through evaporation on a surface of the black matrix 11, and a surface S130 of the initial reflective layer 130 away from the base 20 is a plane; then the surface S130 of the initial reflective layer 130 is further treated by using an etching process (including coating photoresist, developing, etching and peeling, etc.), thereby forming the zigzag structures on the surface S130 of the initial reflective layer 130 away from the base 20 to obtain the reflective layer 13.

In some embodiments, the reflective layer 13 has a multi-layer film structure. In this case, a plurality of films may be sequentially formed on the side of the black matrix 11 away from the base 20, and then the plurality of films are patterned to form the plurality of light-transmitting holes 131, thereby forming the reflective layer 13.

For example, in a case where the reflective layer 13 includes the plurality of film layers 14 stacked in the thickness direction of the color film structure 10, and the surface of the reflective layer 13 away from the base 20 has the microstructures 132 for scattering light, it is possible to treat a surface of a film in a first layer away from the black matrix after forming the film in the first layer, so that the film has microstructures 132 for scattering light or at least one curved surface recessed toward the side where the black matrix 11 is located. In this way, in a process of manufacturing subsequent film layers 14 (e.g., forming subsequent film layers 14 by using an evaporation process), it is possible to make each film layer 14 have microstructures 132 or at least one curved surface recessed towards the side where the black matrix 11 is located, which is the same as the microstructures 132 or the at least one curved surface of the film in the first layer.

Alternatively, in a case where the reflective layer 13 includes the plurality of film layers 14 stacked in the thickness direction of the color film structure 10, it is also possible to treat only one or more film layers 14 farthest from the black matrix 11, so that the one or more film layers 14 farthest from the black matrix 11 among the plurality of film layers 14 included in the reflective layer 13 have a microstructure 132 for scattering light or at least one curved surface recessed towards the side where the black matrix 11 is located.

The color film substrate 100 may be applied to a liquid crystal display (LCD) module or an active luminescent display module. The active luminescent display module may be an electroluminescent display module or a photoluminescent display module. In a case where the display module is the electroluminescent display module, the electroluminescent display module may be an organic electroluminescent (organic light-emitting diode (OLED)) display module or a quantum dot electroluminescent (quantum dot light-emitting diode (QLED)) display module. In a case where the display module is the photoluminescent display module, the photoluminescent display module may be a quantum dot photoluminescent display module.

Figure 11:
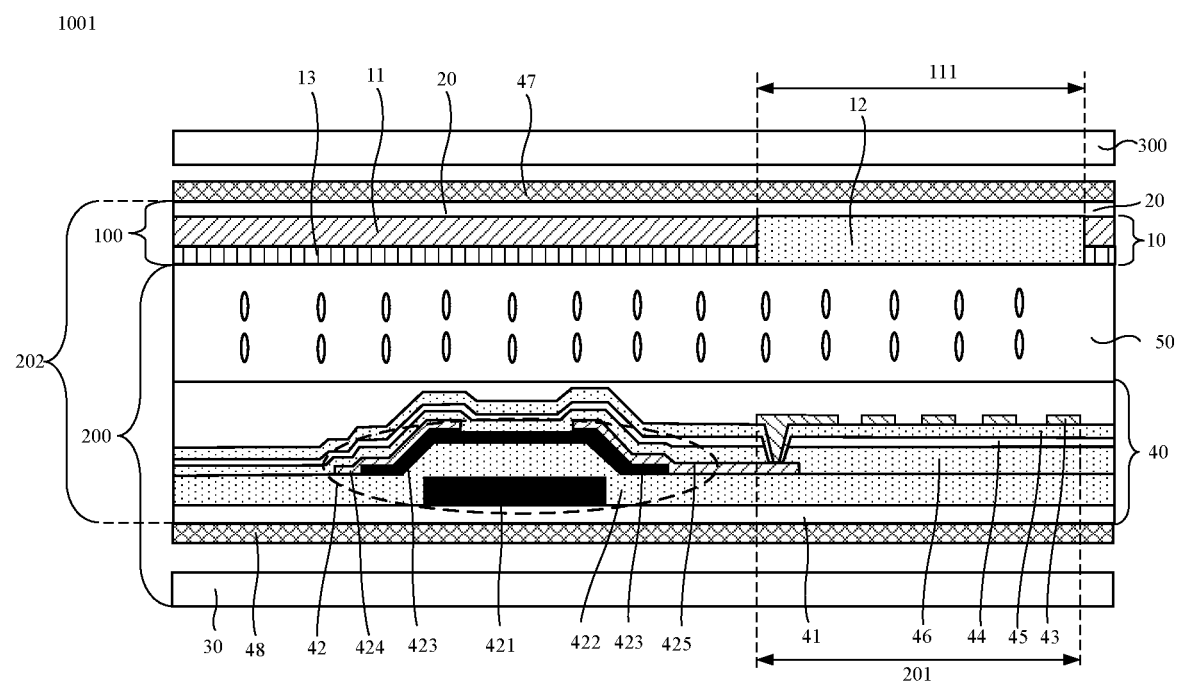
FIG. 11 is a schematic diagram of a display module, in accordance with some embodiments.

In a case where the color film substrate 100 is applied to a LCD display module, in some embodiments, referring to FIG. 11, a display module 1001 is provided, and the display module 1001 is a LCD display module and includes a light-emitting substrate 200 and the color film substrate 100 in any one of the above embodiments, which are arranged in a stack. The light-emitting substrate 200 has a plurality of sub-pixel light-emitting regions 201. An opening 111 of the black matrix 11 of the color film substrate 100 corresponds to a sub-pixel light-emitting region 201.

Referring to FIG. 11, the light-emitting substrate 200 of the LCD display module includes a backlight module 30, an array substrate 40 and a liquid crystal layer 50. The array substrate 40, the liquid crystal layer 50 and the color film substrate 100 constitute a liquid crystal cell 202. The backlight module 30 is disposed on a side of the array substrate 40 away from the color film substrate 100. The backlight module 30 serves to provide a light source for the array substrate 40.

As shown in FIG. 11, each sub-pixel of the array substrate 40 includes a thin film transistor 42 and a pixel electrode 43 that are located on a first base 41. The thin film transistor 42 includes an active layer 423, a source 424, a drain 425, a gate 421 and a portion of a gate insulating layer 422 located between the active layer 423 and the gate 421. The source 424 and the drain 425 are in contact with the active layer 423, and the pixel electrode 43 is electrically connected to the drain of the thin film transistor 42.

In some embodiments, the array substrate 40 further includes a common electrode 44 disposed on the first base 41. The pixel electrode 43 and the common electrode 44 may be disposed in a same layer, and in this case, the pixel electrode 43 and the common electrode 44 each have a comb-tooth structure including a plurality of strip-shaped sub-electrodes. The pixel electrode 43 and the common electrode 44 may also be disposed in different layers, and in this case, as shown in FIG. 11, a first insulating layer 45 is provided between the pixel electrode 43 and the common electrode 44. In a case where the common electrode 44 is disposed between the thin film transistor 42 and the pixel electrode 43, as shown in FIG. 11, a second insulating layer 46 is provided between the common electrode 44 and the thin film transistor 42.

As shown in FIG. 11, the color film substrate 100 includes the color film layer 12 disposed on the base 20. The color film layer 12 at least includes red filter portions, green filter portions and blue filter portions, and the red filter portions, the green filter portions and the blue filter portions are opposite to sub-pixels of the array substrate 40 in one-to-one correspondence. The color film substrate 100 further includes the black matrix 11 disposed on the base 20, and the black matrix 11 serves to separate the red filter portions, the green filter portions and the blue filter portions.

In some embodiments, as shown in FIG. 11, the display module 1001 further includes a first polarizer 47 disposed on a side of the color film substrate 100 away from the liquid crystal layer 50, a cover glass 300 disposed on a side of the first polarizer 47 away from the color film substrate 100, and a second polarizer 48 disposed on a side of the array substrate 40 away from the liquid crystal layer 50.

In a case where the color film substrate 100 is applied to the active luminescent display module, in some embodiments, referring to FIG. 12, another display module 1002 is provided, and the display module is an OLED display module and includes a light-emitting substrate 200 and the color film substrate 100 in any one of the above embodiments, which are arranged in a stack. The light-emitting substrate 200 is an OLED display substrate. The black matrix 11, the color film layer 12 and the reflective layer 13 of the color film substrate 100 are closer to the light-emitting substrate 200 than the base 20 of the color film substrate 100. The light-emitting substrate 200 has a plurality of sub-pixel light-emitting regions 201. An opening 111 of the black matrix 11 of the color film substrate 100 corresponds to a sub-pixel light-emitting region 201.

Referring to FIG. 12, main structures of the light-emitting substrate 200 of the display module 1002 include a display substrate 60 and an encapsulation layer 70 for encapsulating the display substrate 60 that are arranged in sequence. The encapsulation layer 70 may be an encapsulation film or an encapsulation substrate. The color film substrate 100 is disposed on a side of the encapsulation layer 70 away from the display substrate 60.

As shown in FIG. 12, each sub-pixel of the display substrate 60 includes a light-emitting device and a driving circuit that are disposed on a second base 61, and the driving circuit includes a plurality of thin film transistors 62. The light-emitting device includes an anode 63, a light-emitting functional layer 64 and a cathode 65, and the anode 63 is electrically connected to a drain of a thin film transistor 62 serving as a driving transistor among the plurality of thin film transistors 62.

The thin film transistor 62 includes an active layer 621, a source 622, a drain 623, a gate 624 and a portion of a gate insulating layer 625 located between the active layer 621 and the gate 624. The source 622 and the drain 623 are in contact with the active layer 621, and the anode 63 is electrically connected to the drain 623 of the thin film transistor 62.

The display substrate 60 further includes a pixel defining layer 66; the pixel defining layer 66 has a plurality of opening regions, and a light-emitting device is disposed in an opening region. In some embodiments, the light-emitting functional layer 64 includes a light-emitting layer. In some other embodiments, the light-emitting functional layer 64 further includes one or more of an electron transporting layer (ETL), an electron injection layer (EIL), a hole transporting layer (HTL) and a hole injection layer (HIL) in addition to the light-emitting layer.

As shown in FIG. 12, the display substrate 60 further includes a planarization layer 67 disposed between the thin film transistor 62 and the anode 63.

In a case where the display module is an electroluminescent display module or a photoluminescent display module, the display module may be a top-emission display module, and in this case, the anode 63 proximate to the second base 61 is opaque, and the cathode 65 away from the second base 61 is transparent or semi-transparent; alternatively, the display module may be a bottom-emission display module, and in this case, the anode 63 proximate to the second base 61 is transparent or semi-transparent, and the cathode 65 away from the second base 61 is opaque; alternatively, the display module may be a double-sided light-emitting display module, and in this case, the anode 63 proximate to the second base 61 and the cathode 65 away from the second base 61 are each transparent or semi-transparent.

Referring to FIG. 12, the OLED display module further includes a polarizer 68, an optically clear adhesive (OCA) 69 and a cover glass 300 that are all disposed on a side of the color film substrate 100 away from the light-emitting substrate 200.

Figure 13:
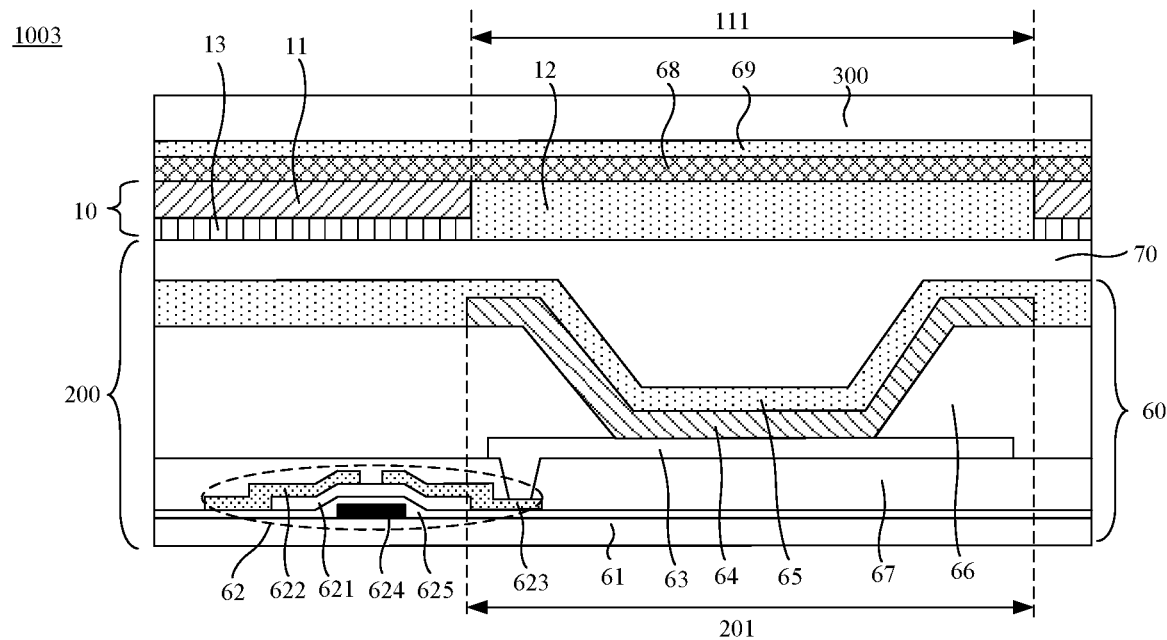
FIG. 13 is yet another schematic diagram of a display module, in accordance with some embodiments.

The color film structure 10 provided by the embodiments of the present disclosure may be directly provided on an encapsulation layer 70 of an organic electroluminescent substrate. Thus, in some embodiments, referring to FIG. 13, a display module 1003 is provided. The display module 1003 is an OLED display module including a light-emitting substrate 200 and the color film structure 10 in any of the above embodiments, and the light-emitting substrate 200 is an organic electroluminescent substrate. The reflective layer 13 of the color film structure 10 is closer to the light-emitting substrate 200 than the black matrix 11 of the color film structure 10. An opening 111 of the black matrix 11 of the color film structure 10 corresponds to a sub-pixel light-emitting region 201.

A structure of the light-emitting substrate 200 of the display module 1003 is similar to the structure of the light-emitting substrate 200 of the display module 1002, which will not be described in detail herein.

The display module provided by any embodiment of the present disclosure includes the color film structure 10 having the reflective layer 13, and the reflective layer 13 is located between the black matrix 11 and the light-emitting substrate 200. The reflective layer 13 is capable of reflecting light irradiated from the light-emitting substrate 200 to the region where the black matrix 11 is located by the light-emitting substrate 200 and reflecting a part of the light onto the light-emitting substrate 200 while not affecting the black matrix 11 to absorb natural light to reduce the reflectivity of a light-emitting surface of the display module 100; and then a part of light is emitted through the color film layer 12 after being reflected by the light-emitting substrate 200, which prevents light emitted to the black matrix 11 from being directly absorbed by the black matrix 11, thereby reducing the light energy loss of the light emitting substrate 200 by the black matrix 11, improving the light-emitting efficiency of the display module and the display effect of the display module.

Figure 14:
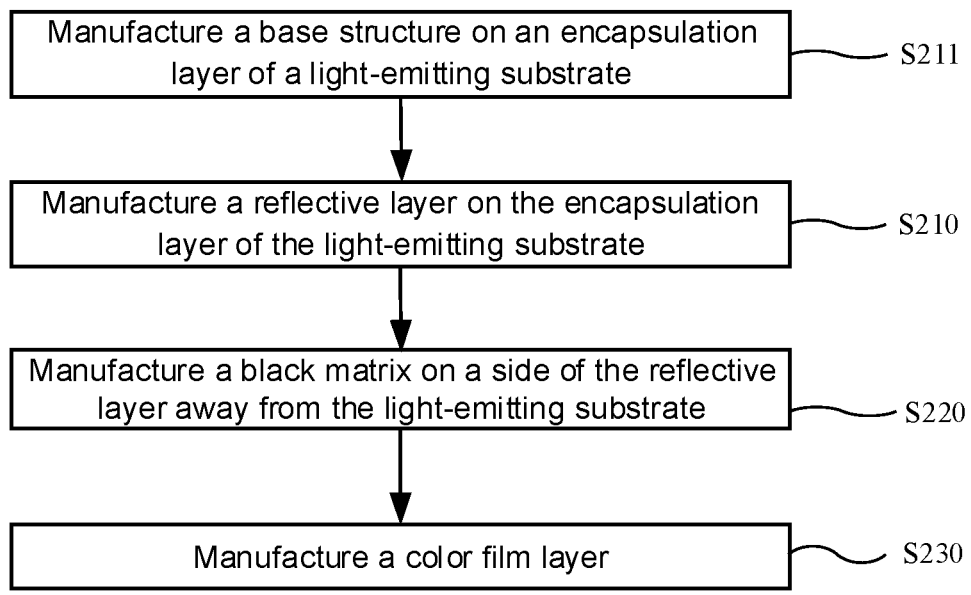
FIG. 14 is a flow diagram of a manufacturing method of a display module, in accordance with some embodiments.
Figure 15:
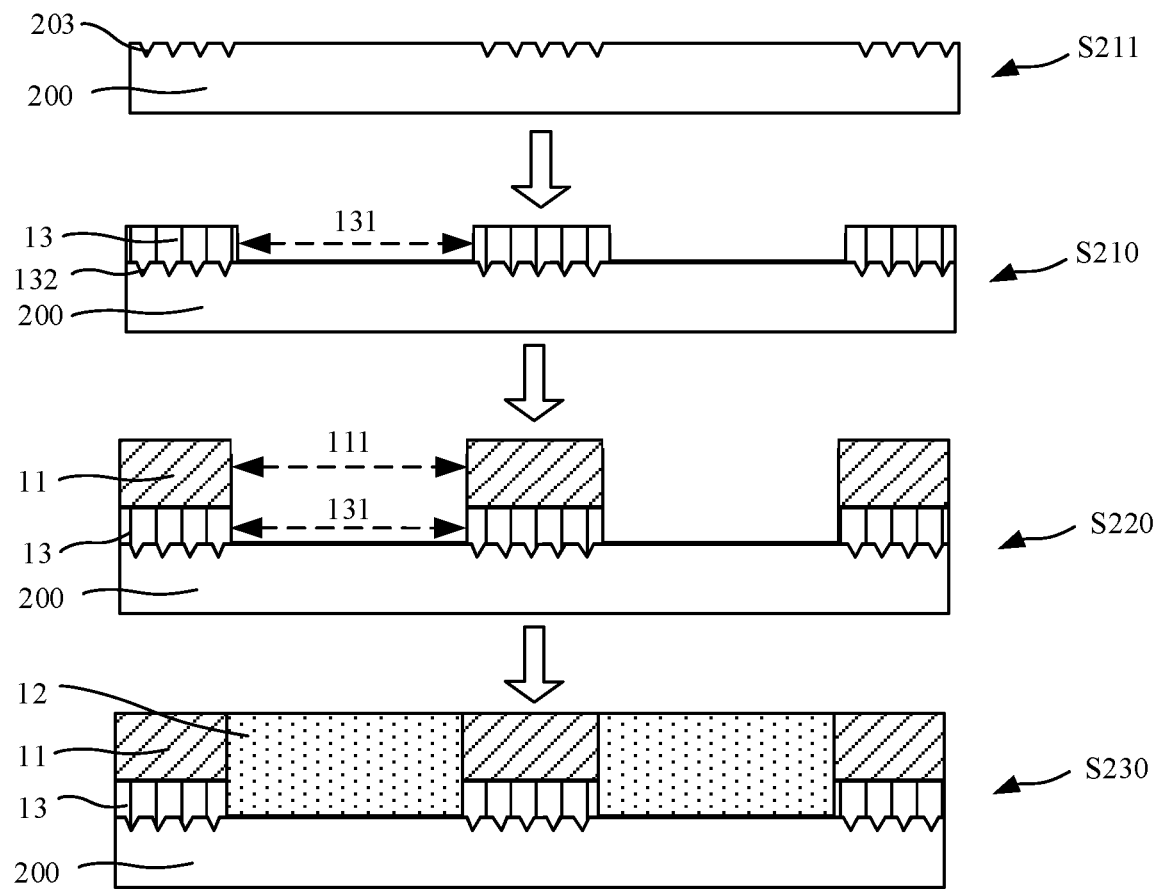
FIG. 15 is a schematic diagram showing steps of manufacturing a display module, in accordance with some embodiments.

Referring to FIGS. 14 and 15, a manufacturing method of the above display module includes S210 to S230.

In S210, a reflective layer 13 is manufactured on an encapsulation layer of a light-emitting substrate 200.

In S220, a black matrix 11 is manufactured on a side of the reflective layer 13 away from the light-emitting substrate 200.

An orthogonal projection of the reflective layer 13 on the light-emitting substrate 200 is covered by an orthogonal projection of the black matrix 11 on the light-emitting substrate 200.

In S230, a color film layer 12 is manufactured.

The color film layer 12 includes a plurality of filter portions 121, and at least a portion of each filter portion 121 is located in an opening 111 of the black matrix 11.

In some embodiments, in a case where a surface of the reflective layer 13 proximate to the light-emitting substrate 200 has microstructures 132 for scattering light, or includes at least one curved surface recessed towards a side where the black matrix 11 is located, referring to FIGS. 14 and 15, before the S210 (in which the reflective layer 13 is manufactured on the encapsulation layer of the light-emitting substrate 200), the manufacturing method further includes S211.

In S211, base structures 203 are manufactured on the encapsulation layer of the light-emitting substrate 200. Morphology of a surface of the base structures 203 away from the light-emitting substrate 200 is adapted to morphology of a surface, proximate to the light-emitting substrate 200, of the reflective layer 13 to be formed, so that in a subsequent step of manufacturing the reflective layer 13, the surface of the reflective layer 13 proximate to the light-emitting substrate 200 forms the microstructures 132 for scattering light or the at least one curved surface recessed towards the side where the black matrix 11 is located.

For example, referring to FIG. 15, a surface of the encapsulation layer (generally made of silicon nitride) of the light-emitting substrate 200 is pretreated, that is, the surface of the encapsulation layer is etched or ion bombarded in advance, so as to manufacture the base structures 203 (such as grooves regularly arranged, grooves arranged in an array or convex curved surface structures) that are adapted to the microstructures 132 or the at least one curved surface recessed towards the side where the black matrix 11 is located. Alternatively, a base is deposited on the surface of the encapsulation layer first, and then a surface of the base is pretreated to manufacture the base structures 203 adapted to the microstructures 132 or the at least one curved surface recessed toward the side where the black matrix 11 is located.

Afterwards, the reflective layer 13 is directly manufactured on the base structures 203 through processes such as evaporation, vapor deposition, sputtering or coating. The reflective layer 13 may have a single-layer film structure, or the reflective layer 13 includes a plurality of film layers stacked in the thickness direction of the light-emitting substrate 200.

Figure 16:
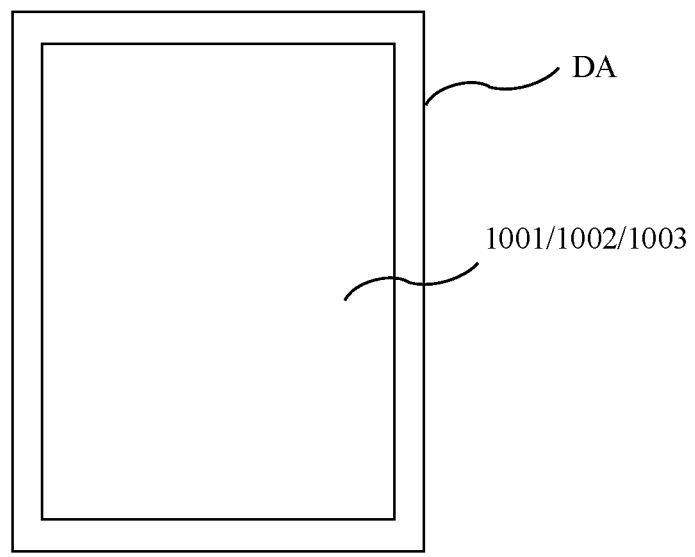
FIG. 16 is a schematic diagram of a display apparatus, in accordance with some embodiments.

As show in FIG. 16, some embodiments of the present disclosure provide a display apparatus DA, including the display module 1001/1002/1003 in any one of the above embodiments, and the display module includes the color film structure 10 having the reflective layer 13. The reflective layer 13 is capable of reflecting light emitted from the light-emitting substrate 200 to the region where the black matrix 11 is located and reflecting a part of the light onto the light-emitting substrate 200 while not affecting the black matrix 11 to absorb natural light to reduce the reflectivity of the light-emitting surface of the display module; and then a part of light is emitted through the color film layer 12 after being reflected by the light-emitting substrate 200, which reduces the light loss of the light-emitting substrate 200 caused by the black matrix 11, thereby improving the product performance of the display apparatus and improving the light transmission efficiency of the display apparatus.

The display apparatus may be any product or component having a display function such as a television, a display, a notebook computer, a tablet computer, a cell phone or a navigator.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A color film structure, comprising:
    a black matrix having a plurality of openings;
    a color film layer including a plurality of filter portions, at least a portion of each filter portion being located in an opening of the black matrix; and
    a reflective layer located on a side of the black matrix configured to be proximate to a light-emitting substrate, an orthogonal projection of the reflective layer on a plane where the black matrix is located being covered by the black matrix; the reflective layer being configured to reflect at least a part of light emitted from the light-emitting substrate to the black matrix back to the light-emitting substrate, so that at least a part of the light reflected back to the light-emitting substrate is emitted through the color film layer, wherein
    a surface of the reflective layer configured to be away from the light-emitting substrate has microstructures for scattering light, the microstructures include at least one of zigzag structures, wavy structures, columnar structures arranged in an array, conical structures arranged in an array, and spherical structures arranged in an array; or
    the surface of the reflective layer configured to be away from the light-emitting substrate includes at least one curved surface recessed towards a side where the black matrix is located.

2. The color film structure according to claim 1, wherein the orthogonal projection of the reflective layer on the plane where the black matrix is located completely coincides with the black matrix.

3. The color film structure according to claim 1, wherein the reflective layer has a plurality of light-transmitting holes, each light-transmitting hole corresponds to an opening; wherein
    a border of an orthogonal projection of each light-transmitting hole on the plane where the black matrix is located coincides with a border of the opening, or is located outside a border of the opening.

4. The color film structure according to claim 1, wherein a surface of the reflective layer configured to be proximate to the light-emitting substrate is a plane; or
    a surface of the reflective layer configured to be proximate to the light-emitting substrate has microstructures for scattering light, the microstructures include at least one of zigzag structures, wavy structures, columnar structures arranged in an array, conical structures arranged in an array, and spherical structures arranged in an array; or
    a surface of the reflective layer configured to be proximate to the light-emitting substrate includes at least one curved surface recessed towards a side where the black matrix is located.

5. The color film structure according to claim 4, wherein of the surface configured to be proximate to the light-emitting substrate, a portion located between two adjacent openings of the black matrix includes two curved surfaces recessed towards the side where the black matrix is located, the two curved surfaces are symmetrically arranged relative to a bisector of a reference line, the reference line is a dummy line in an arrangement direction of the two adjacent openings and from one of the two adjacent openings to the other opening; and
    in the arrangement direction of the two adjacent openings and a direction from either of the two adjacent openings to the bisector, a thickness of a portion of the reflective layer located between the two adjacent openings increases.

6. The color film structure according to claim 4, wherein the reflective layer has a plurality of light-transmitting holes, the surface of the reflective layer configured to be proximate to the light-emitting substrate includes a plurality of curved surfaces recessed towards the side where the black matrix is located, each curved surface surrounds a light-transmitting hole.

7. The color film structure according to claim 1, wherein the reflective layer has a single-layer film structure.

8. The color film structure according to claim 7, wherein a material of the reflective layer includes at least one of silver, magnesium, copper and aluminum.

9. The color film structure according to claim 1, wherein the reflective layer includes a plurality of film layers stacked in a thickness direction of the color film structure, and a difference in refractive index between any two adjacent film layers is greater than or equal to 0.3.

10. The color film structure according to claim 9, wherein a thickness of at least one film layer in the reflective layer is an integer multiple of ¼ of a target wavelength; wherein
    the target wavelength is a reference value set according to a wavelength range of light emitted by the light-emitting substrate.

11. The color film structure according to claim 9, wherein the plurality of film layers included in the reflective layer include first film layers and second film layers that are alternately arranged; wherein
    a material of the first film layers includes silicon oxide and/or polyimide, and a material of the second film layers includes silicon nitride.

12. A color film substrate, comprising:
    a base; and
    the color film structure according to claim 1, which is disposed on the base, the reflective layer of the color film structure being disposed on a side of the black matrix of the color film structure away from the base.

13. A manufacturing method of a color film substrate, the color film substrate according to claim 12, the manufacturing method comprising:
    manufacturing the black matrix with the plurality of openings on the base;
    manufacturing the reflective layer on a side of the black matrix away from the base, wherein an orthogonal projection of the reflective layer on the base is covered by an orthogonal projection of the black matrix on the base; a surface of the reflective layer configured to be proximate to the black matrix has microstructures for scattering light, the microstructures include at least one of zigzag structures, wavy structures, columnar structures arranged in an array, conical structures arranged in an array, and spherical structures arranged in an array; or the surface of the reflective layer configured to be proximate to the black matrix includes at least one curved surface recessed towards a side where the black matrix is located; and manufacturing the color film layer, wherein the color film layer includes the plurality of filter portions, and the at least a portion of each filter portion is located in the opening of the black matrix.

14. The manufacturing method according to claim 13, wherein manufacturing the reflective layer on the side of the black matrix away from the base, includes:

manufacturing an initial reflective layer on the side of the black matrix away from the base, wherein an orthogonal projection of the initial reflective layer on the base is covered by the orthogonal projection of the black matrix on the base; and performing surface treatment on a surface of the initial reflective layer away from the base to form microstructures for scattering light on the surface, or to form at least one curved surface recessed towards a side where the black matrix is located on the surface.

15. A display module, comprising:
a light-emitting substrate, wherein the light-emitting substrate is an organic electroluminescent substrate, or the light-emitting substrate includes a backlight module, an array substrate and a liquid crystal layer; the light-emitting substrate has a plurality of sub-pixel light-emitting regions; and
the color film substrate according to claim 12, which is arranged in a stack with the light-emitting substrate, wherein an opening of the black matrix of the color film substrate corresponds to a sub-pixel light-emitting region; in a case where the light-emitting substrate is the organic electroluminescent substrate, the black matrix, the color film layer and the reflective layer of the color film substrate are closer to the light-emitting substrate than the base of the color film substrate; in a case where the light-emitting substrate includes the backlight module, the array substrate and the liquid crystal layer, the backlight module is disposed on a side of the array substrate away from the color film substrate.

16. A display apparatus, comprising the display module according to claim 15.

17. A display module, comprising:
a light-emitting substrate, wherein the light-emitting substrate is an organic electroluminescent substrate, and the light-emitting substrate has a plurality of sub-pixel light-emitting regions; and
the color film structure according to claim 1, which is directly disposed on an encapsulation layer of the light-emitting substrate, wherein the reflective layer of the color film structure is closer to the light-emitting substrate than the black matrix of the color film structure;
an opening of the black matrix of the color film substrate corresponds to a sub-pixel light-emitting region.

18. A manufacturing method of a display module, the display module according to claim 17, the manufacturing method comprising:

manufacturing the reflective layer on the encapsulation layer of the light-emitting substrate, wherein a surface of the reflective layer configured to be away from the encapsulation layer has microstructures for scattering light, the microstructures include at least one of zigzag structures, wavy structures, columnar structures arranged in an array, conical structures arranged in an array, and spherical structures arranged in an array; or the surface of the reflective layer configured to be away from the encapsulation layer includes at least one curved surface recessed towards a side where the black matrix is located;

manufacturing the black matrix on a side of the reflective layer away from the light-emitting substrate, wherein an orthogonal projection of the reflective layer on the light-emitting substrate is covered by an orthogonal projection of the black matrix on the light-emitting substrate; and manufacturing the color film layer, wherein the color film layer includes the plurality of filter portions, and the at least a portion of each filter portion is located in the opening of the black matrix.

19. The manufacturing method according to claim 18, before manufacturing the reflective layer on the encapsulation layer of the light-emitting substrate, the manufacturing method further comprising:

manufacturing base structures on the encapsulation layer of the light-emitting substrate, wherein morphology of a surface of the base structures away from the light-emitting substrate is adapted to morphology of a surface, proximate to the light-emitting substrate, of the reflective layer to be formed;

manufacturing the reflective layer on the encapsulation layer of the light-emitting substrate, includes:
forming microstructures for scattering light on the surface of the reflective layer proximate to the light-emitting substrate, or
forming at least one curved surface recessed towards the side where the black matrix is located on the surface of the reflective layer proximate to the light-emitting substrate.

* * * * *